United States Patent
Burkard et al.

(10) Patent No.: US 6,859,714 B2
(45) Date of Patent: Feb. 22, 2005

(54) DEVICE AND METHOD FOR DIAGNOSING BRAKE AND DRIVE PULL

(75) Inventors: Friedhelm Burkard, Darmstadt (DE); Klaus Landesfeind, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/299,190

(22) Filed: Nov. 18, 2002

(65) Prior Publication Data

US 2003/0120435 A1 Jun. 26, 2003

(30) Foreign Application Priority Data

Nov. 17, 2001 (DE) .......................................... 101 56 625

(51) Int. Cl.$^7$ ........................... G06F 7/00; G06F 19/00; G05D 1/00
(52) U.S. Cl. ............................. 701/78; 701/83; 701/48; 303/140
(58) Field of Search .............................. 701/1, 82, 83, 701/48, 70–75, 78–80; 303/139, 140, 146, 147

(56) References Cited

U.S. PATENT DOCUMENTS

| | | | | |
|---|---|---|---|---|
| 5,316,379 A | * | 5/1994 | Becker et al. ............... | 303/140 |
| 5,439,245 A | * | 8/1995 | Breitenbacher et al. .. | 280/5.518 |
| 5,826,204 A | * | 10/1998 | Ulm ............................... | 701/1 |
| 5,862,503 A | * | 1/1999 | Eckert et al. .................. | 701/78 |
| 5,925,083 A | * | 7/1999 | Ackermann ................... | 701/41 |
| 6,226,579 B1 | * | 5/2001 | Hackl et al. .................. | 701/41 |
| 2002/0054843 A1 | * | 5/2002 | Maunula ................... | 423/213.5 |
| 2003/0120435 A1 | * | 6/2003 | Burkard et al. ............... | 702/41 |

FOREIGN PATENT DOCUMENTS

| | | |
|---|---|---|
| DE | 40 38 079 | 6/1992 |
| DE | 199 57 171 | 5/2001 |

\* cited by examiner

*Primary Examiner*—Thomas G. Black
*Assistant Examiner*—Ronnie Mancho
(74) *Attorney, Agent, or Firm*—Kenyon & Kenyon

(57) ABSTRACT

A device for a vehicle equipped with a wheel slip control system is described as having a determination device for determining first variables, each of which may be assigned to one wheel and/or the associated wheel brake. In addition, it includes a calculation device in which at least one second variable is calculated for at least one wheel axle of the vehicle from the first variables associated with the wheels of this wheel axle, this second variable being a measure of the difference between the first variables associated with this wheel axle. In addition, this device includes an averaging device in which a third variable is determined by averaging over time and/or filtering the at least one second variable, and it includes a comparator device which compares the value of the third variable with a preselectable limit value. The averaging and/or filtering in the averaging device covers such a long period of time that the third variable determined there is a measure of a difference between the values of the first variables associated with this wheel axle from one another which is not due to an intervention by the wheel slip control system, and the device is used to detect a pull brake or a pull drive.

6 Claims, 2 Drawing Sheets

DEVICE AND METHOD FOR DIAGNOSING BRAKE AND DRIVE PULL

FIELD OF THE INVENTION

The present invention relates to a device and a method in which the yaw moment which occurs in ABS operation of a vehicle is compensated by generating a counter-torque.

BACKGROUND INFORMATION

German Published Patent Application No. 40 38 079 describes such a method. The method described there may optimize compensation of the counter-torque by influencing the steering angle determined for the compensation.

German Published Patent Application No. 199 57 171 describes a method of detecting an asymmetrical braking intervention in motor vehicles equipped with an electric steering system. This method may be characterized in that a wheel deflection not induced by the steering wheel is detected in the event of a braking intervention involving the steered wheels while the motor vehicle is in motion. This wheel deflection may be differentiated from other possible influences causing wheel deflection, and an asymmetrical braking intervention may be detected on this basis.

Conventional features may be derived from German Published Patent Application No. 40 38 079.

SUMMARY OF THE INVENTION

Wheel slip control systems, e.g., electronic vehicle dynamics control systems (ESP=electronic stability program), anti-lock brake systems or anti-spin regulation systems may regulate the slip of each wheel of the vehicle individually in order to optimize driving stability and steerability even during, for example, braking of a vehicle or driving on roads with variable adherence or driving on roads with low coefficients of friction.

However, this control system may have the result that a brake system which pulls is not detected at all or is detected only at a very late point in time. The present invention may detect brakes that pull and may display the error before there is any significant negative effect on the braking effect. The present invention may also be used for detecting a persistent unequal distribution of driving torques. This may allow the driver to respond promptly to a pull brake or to pull of the drive. This response may involve taking the car to a repair shop as quickly as possible.

The term "pull brake" should be explained first. Pull may occur when, in the case of a symmetrical braking effect on both wheels of one axle, which is intended by the driver or by the wheel slip control system, an asymmetrical braking effect nevertheless occurs, but not due to the road surface properties (e.g., a $\mu$ split). This may have two basic causes:
1. The same brake pressure is erroneously not established by the control system in both wheel brakes of one wheel axle, and thus a difference in the braking effect occurs, or
2. The same brake pressure (i.e., the desired brake pressure) in the two wheel brakes of one wheel axle results in different braking effects.

As in the case of the braking effect, an asymmetrical driving torque acting on the two wheels of one driven axle may also be undesirable. Here again, this may not include special cases of certain road surface properties (e.g., a $\mu$ split).

Early detection of the various changes in or aging of brakes may be required to ensure optimum functioning of an electronic vehicle dynamics control system. Examples of factors causing differences in aging of brakes may include, e.g., differences in wear of materials.

The present invention relates to a device for a vehicle equipped with a wheel slip control system, which may be composed of a determination device for determining first variables, which may each be assigned to a wheel and/or the particular wheel brake, a calculation device in which at least one second variable may be calculated for at least one wheel axle of the vehicle from the first variables associated with the wheels of this wheel axle, this second variable being a measure of the difference between the values of the first variables associated with this wheel axle, an averaging device in which a third variable may be determined by averaging over time and/or filtering the at least one second variable, and a comparator device which compares the value of the third variable with a preselectable limit value.

According to an example embodiment and/or example method of the present invention, the averaging and/or filtering in the averaging device may cover such a long period of time that the third variable determined there may be a measure of a difference between the values of the first variables associated with this wheel axle, this deviation not being due to an intervention measure by the wheel slip control system, and the device may be used to detect a pull brake or a pull drive.

The period of time included for averaging and/or filtering may be greater than the conventional duration of a regulating measure performed by the wheel slip control system. This may ensure that short-term asymmetries will not incorrectly result in detection of a pull brake or a pull drive. Short-term asymmetries may be caused by intervention measures by a wheel slip control system, for example.

The first variables may be variables associated with vehicle dynamics.

The first variables may represent one of the following variables:

yaw moments assigned to a wheel or wheel braking torques or wheel driving torques or wheel braking forces or wheel driving forces or coefficients of friction or pressures of the brake shoes acting on the brake disks or wheel brake pressures.

The second variable calculated by the calculating device may be a dimensionless variable. Dimensionless variables (in conjunction with normalization in particular) may often have the property of being simple to process in computing devices.

In a second example embodiment of the present invention, the device may include a determination device for determining first variables which may each be assigned to a wheel and/or the wheel brake associated therewith, an averaging device in which averaged first variables may be determined by averaging over time and/or filtering the first variables, and a calculation device in which at least one third variable may be calculated for at least one wheel axle of the vehicle from the averaged first variables associated with the wheels of this wheel axle, this third variable being a measure of the difference between the values of the first variables associated with this wheel axle, and a comparator device which compares the value of the third variable with a preselectable limit value.

According to this example embodiment, averaging and/or filtering in the averaging device may cover such a long period of time that the third variable determined in the calculation device is a measure of a difference between the values of the first variables associated with this wheel axle when the deviation is not caused by an intervention measure by the wheel slip control system, and the device may be used to detect a pull brake or a pull drive.

An difference between the second example embodiment and the first example embodiment described above is that the calculation of the second variables and the averaging are switched.

DETAILED DESCRIPTION

Figure 1:
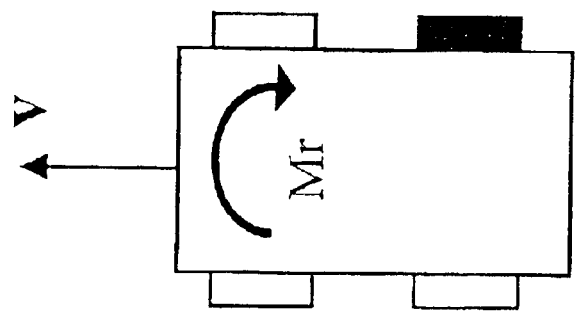
FIG. 1 shows the influence of two braking interventions on the yawing behavior of the vehicle.
Figure 1:
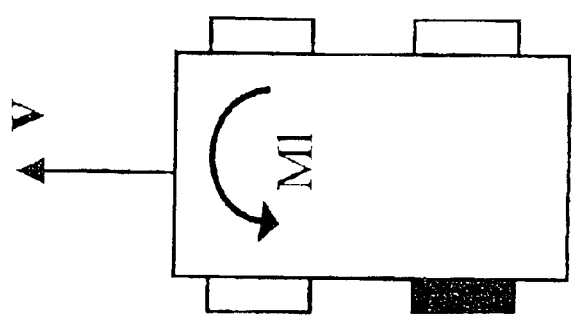

FIG. 1 shows a top view of a vehicle which is moving straight ahead in the direction of arrow v. Now let us imagine the vehicle being braked on the two rear wheels at time t0. If the road surface is uniform, i.e., in particular if there is no μ split, the vehicle should continue to move straight ahead. Now let's imagine the following scenario:

1. Only the left rear wheel is braked further with the same braking effect as at time t0, and the braking effect on the right rear wheel is canceled. This is illustrated at the left of FIG. 1. The braked rear wheel is shown as black. As a result, a yaw moment Ml is generated, which attempts to turn the vehicle in the direction of the arrow shown.
2. Only the right rear wheel is braked further with the same braking effect as at time t0, and the braking effect of the left rear wheel is canceled. This is illustrated at the right of FIG. 1. The braked right rear wheel is shown as black. As a result, a yaw moment Mr is generated, which attempts to turn the vehicle in the direction of the arrow shown.

The yaw moments are assumed to be referred to the center of gravity of the vehicle.

In the ideal case, of course, |Ml|=|Mr|, i.e., the yaw moments balance one another and the vehicle continues to travel straight ahead. However, in the case of different yaw moments, there is a resultant yaw moment, i.e., |Ml|≠|Mr|.

If such a resultant yaw moment occurs constantly in braking, in particular on road surfaces that are uniform with respect to friction, this may indicate that the brake is pulling.

These considerations may also be applied to the drive case when the driving torque is asymmetrically distributed between the two wheels of the driven axle.

In the following discussion, the absolute values are meant for variables Ml and Mr. Therefore, pull s(t) involving yaw moments is defined as follows with respect to the center of gravity, for example:

$$s(t)=(Ml-Mr)/(Ml+Mr)$$

This is a dimensionless variable, which is a measure of a difference in brake performance or drive performance of the two wheels of one axle, t denoting the time, and s(t) assuming values between −1 and 1.

1. s(t)=−1 occurs when Mr is much larger than Ml. In this case, there is pull to the right.
2. s(t)=+1 occurs when Mr is much smaller than Ml. In this case there is pull to the left.
3. s(t)≈0 occurs when Mr and Ml are approximately equal. Variable s(t) may be generalized as follows:

$$st(t)=(a1*Ml-a2*Mr)/(a3*Ml+a4*Mr)$$

Thus, equivalent measures for pull may be defined for all variables, which are proportional to the yaw moments or at least correlate with them, by replacing the yaw moments with the corresponding variables. The following variables may be used for this:

wheel braking torques,
wheel driving torques,
wheel braking forces,
wheel driving forces,
coefficients of friction,
wheel brake pressures,
pressures of the brake shoes on the brake disks.

The term braking torque may be defined as the product of the frictional forces caused by the pressure acting on the brake disks and the distance between the points of application of these forces and the axis of rotation of the wheels. The braking torque is thus the sum of the individual wheel braking torques, which are defined for each wheel according to the definition given above. The equations given above for s(t) and st(t) may then also be used for the calculation of pull based on the wheel braking torques if a symmetrical (with respect to the two wheels of one axle) driver-dependent or driver-independent braking intervention is provided.

The following description may be useful for understanding the concept of wheel driving torque. The driving torque of the engine is distributed uniformly to both wheels due to the differential gearing. This may not result in a yaw moment about the center of gravity of the vehicle in acceleration on a homogenous road surface. The wheel driving torque is the engine torque supplied on one side to a wheel. The equations given above for s(t) and st(t) may then be used for calculation of pull based on wheel driving torques if a symmetrical (with respect to the two wheels on one axle) driver-dependent or driver-independent driving torque is provided. Different wheel driving torques may be caused, for example, by a defect in the differential or by poor or defective wheel bearings.

Wheel braking forces and wheel driving forces may also be defined by analogy with the wheel braking torque and the wheel driving torque. To do so, the torques are converted into forces over a defined length of a lever arm.

Coefficient of friction μ is closely related to slip and may be an indication of the quality of the frictional contact between the tire and the road surface.

With each of these variables it may be possible to formulate an equation equivalent to the equation s(t)=(Ml−Mr)/(Ml+Mr) or the equation st(t)=(a1*Ml−a2*Mr)/(a3*Ml+a4*Mr), which may be used for diagnosing the pull of a brake or drive.

In particular, using the measured or estimated wheel brake pressure, this yields $$sp(t)=(pl-pr)/(pl+pr)$$

where pl is the brake pressure in the wheel brake cylinder of the left wheel of the axle in question, and pr is the brake pressure in the wheel brake cylinder of the right wheel of the axle in question. Instead of the brake pressure, variables such as the pressure of the brake jaws acting on the brake disks may also be conceivable. This may allow the use of the present invention in vehicles equipped with an electromechanical brake (EMB).

The pull of an axle described here may be expandable by summation over all wheels and/or axles to include pull of a vehicle or a combination.

If active control intervention by a vehicle dynamics control system is taking place in the vehicle at the moment, then different brake pressures may be desired in the right and left wheel brakes of a vehicle axle. In other words, although sp(t) is not equal to zero, for example, this is still not a case of pull.

For this reason, the pull variables may be averaged. Such averaging may be performed as follows in a very general form:

$$spm = \int_{t1}^{t2} sp(t) \cdot w(t) \, dt$$

where spm denotes the weighted average of sp(t) over time, determined from time t=t1 until a later point in time t=t2, where the duration of integration, i.e., t2−t1, should be selected to be sufficiently large, namely much larger than conventional durations of interventions of a wheel slip control system.

Continuous integration may be replaced in the discrete case by a sum:

$$spm = \sum_{k=0}^{N} spk \cdot wk$$

where spk is the discrete value of sp at time t=tk; w(t) and wk are a weighting function and a weighting factor, respectively.

An exponential weighting function shall now be considered as an example:

$$w(t) = 1/tau \cdot \exp[-(t2-t)/tau]$$

where tau is a time constant (e.g., tau=t2−t1), and exp denotes the exponential function. In addition, t<t2. For points in time far back in the past, e.g., t=t1, the exponential function assumes a very small value. This means that the pull calculated at this point in time may have only a very weak effect in the averaging with respect to the brake pressure. In the case of discrete time intervals, wk=$q^k$, where q≦1 is to be used accordingly. Other weighting functions are may also be provided instead of the exponential function described here, and the weighted averages presented here may be calculated not only for the pull of the wheel brake pressure.

By analogy with the averaging described here, the characteristic value may also be determined by low-pass filtering. In the case of discrete time intervals, low-pass filtering may be used for estimating wheel brake pressure p(t):

$$S_{k+1} = S_k + a \cdot (S_{in} - S_k)$$

where $s_{in}$ is the instantaneous pull determined, i.e., the input variable, $S_k$ is the filtered pull determined most recently, i.e., the output variable. This value is updated to $S_{k+1}$ in the instantaneous step, where a is a parameter influenced by the filter time constant. Thus, the limiting value for $s_k$ is also a characteristic value of pull.

Figure 2:
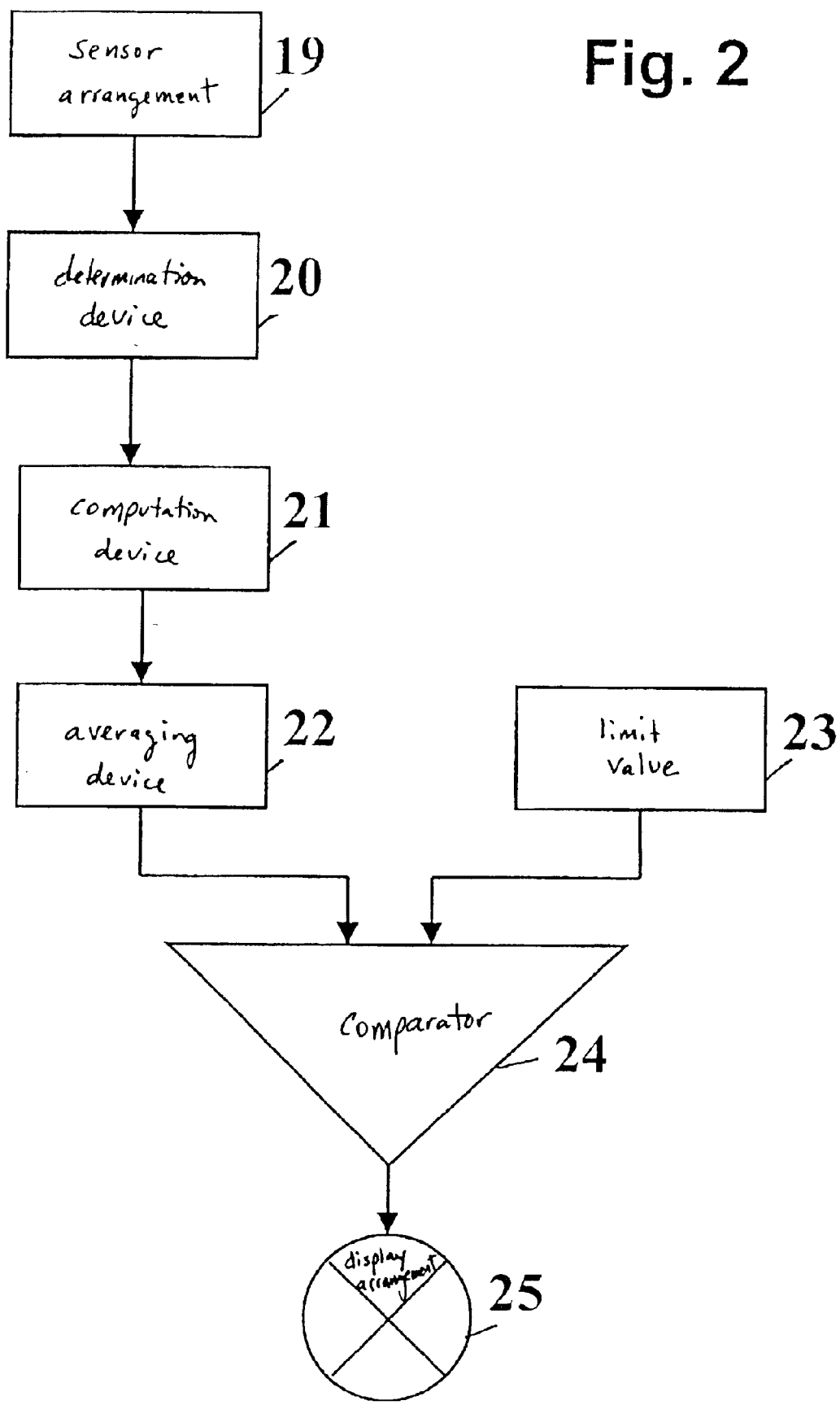
FIG. 2 is a flow chart illustrating the procedure of an example method of diagnosing a pull brake and a pull drive.

Finally, the sequence of this method for determining pull of a brake or a drive is shown in FIG. 2 in the form of a flow chart.

Block 19 includes a sensor arrangement which may be, for example, wheel brake pressure sensors, transverse acceleration sensors, yaw rate sensors or wheel rpm sensors.

The output signals of these sensors 19 are relayed to determination device 20, which determines first variables which may be assigned to one wheel or the associated wheel brake. Block 20 includes an analyzing arrangement for the sensor signals plus possibly mathematical computation models and a computation arrangement required for using them.

Two example embodiments of block 19 and block 20 are presented below:

1. Block 19 contains the brake pressure sensors for the individual wheel brakes. The output signals of these sensors are converted directly in block 20 to a form suitable for further processing. Brake pressure sensors for the individual wheel brakes are provided for the electro-hydraulic brake (EHB), for example.
2. Block 19 contains only a pressure sensor such as that provided with many wheel slip control systems. Block 20 contains a computation arrangement as well as mathematical models by which the wheel brake pressures in the individual wheel brakes may be estimated.

It may be important that block 20 provides the first variables whose pull is to be calculated. These may be, for example, the yaw moments with respect to the individual wheels, the wheel braking torques, the wheel driving torques, the wheel braking forces, the wheel driving forces, the coefficients of friction, the wheel brake pressures, etc. These variables may either be measured directly by the sensors contained in block 19 or calculated in block 20 from the output signals of the sensors contained in block 19 by using mathematical models. The output signals of block 20 are relayed to block 21.

The pull calculation is performed in computation device 21 on the basis of the output signals (=first variables) from block 20. For example, function s(t) or function st(t) or function sp(t) is calculated. The output signals of block 21 (=second variables) are relayed to block 22.

Averaging and/or filtering with respect to the pull function calculated in block 21 is performed in averaging device 22. The output signals of block 22 (=third variables) are relayed to block 24.

A limit value which may be independent of the driving state or dependent on the instantaneous driving state is provided in block 23. The output signals of block 23 are also relayed to block 24.

A comparison between the limit value from block 23 and the average or filtered value provided by block 22 is performed in comparator device 24. Pull is detected when the value provided by block 22 exceeds the limit value provided by block 23. In the case when there is pull, one or more of the measures mentioned below may be implemented, e.g.:

The driver may be informed via a display arrangement 25.

An intervention in the engine control may be implemented. For example, the maximum allowed engine power may be limited.

An intervention in the brake regulating system may be implemented.

In the case of averaging in averaging device 22, it may be important for this to take place over a sufficiently long period of time. In particular, this period of time should be much longer than the conventional period of duration of the intervention by the wheel slip control system. This may be related to the feature that different brake pressures may be temporarily induced intentionally in the two wheels of one wheel axle by the wheel slip control system as a function of the driving condition. Such different pressures should not be interpreted as pull of the brakes. A conventional duration of an intervention by the wheel slip control systems may be less than one second. In averaging, a period of time to be considered on the order of a few minutes of total braking time or more is proposed.

In addition, it should be noted that in the example embodiment in FIG. 2, the pull calculation is performed first and then the averaging is performed. This sequence may be reversed. Then all the first variables may be averaged and next the pull may be calculated from these averages. In this connection, it should be pointed out that the above-mentioned equation $$s(t)=(Ml-Mr)/(Ml+Mr)$$

merely represents an example embodiment. Pull may also be calculated by using the equation $$s(t)=Ml-Mr.$$

This variable is no longer dimensionless. Since s(t) is a linear function of Ml and Mr here, the above-mentioned switching of the pull calculation and averaging may yield the same result for pull defined in this manner.

What is claimed is:

1. A device for detecting one of a pull brake and a pull drive of a vehicle equipped with a wheel slip control system, comprising:

a determination device for determining first variables, each assignable to one of a wheel and an associated wheel brake;

a calculation device for calculating at least one second variable for at least one wheel axle of the vehicle from a set of the first variables associated with wheels of the at least one wheel axle, the at least one second variable being a measure of a difference between the set of the first variables associated with the at least one wheel axle;

an averaging device for determining a third variable by at least one of averaging over time and filtering the at least one second variable for a period of time such that the third variable determined there is a measure of a difference between values of the set of the first variables associated with the at least one wheel axle, the difference being not due to an intervention by the wheel slip control system; and a comparator device for comparing a value of the third variable with a preselectable limit value.

2. The device according to claim 1 wherein the first variables include variables pertaining to vehicle dynamics.

3. The device according to claim 2, wherein the first variables represent one of yaw moments assigned to the wheel, wheel braking torques, wheel driving torques, wheel braking forces, wheel driving forces, coefficients of friction, pressures of brake shoes acting on brake disks, and wheel brake pressures.

4. The device according to claim 3, wherein the at least one second variable calculated by the calculation device is a dimensionless variable.

5. A device for detecting one of a pull brake and a pull drive of a vehicle equipped with a wheel slip control system, comprising:

a determination device for determining first variables, each assignable to at least one of a wheel and an associated wheel brake;

an averaging device for determining averaged first variables by at least one of averaging over time and filtering the first variables;

a calculation device for calculating at least one third variable for at least one wheel axle of the vehicle from a set of the averaged first variables associated with wheels of the at least one wheel axle, the at least one third variable being a measure of a difference between the set of the first variables associated with the wheels of the at least one wheel axle; and a comparator device for comparing a value of the at least one third variable with a preselectable limit value, wherein the at least one of averaging over time and filtering in the averaging device is for a period of time such that the at least one third variable determined is a measure of the difference between values of the set of the first variables associated with the at least one wheel axle, when the difference is not due to an intervention by the wheel slip control system.

6. A method for detecting one of a pull brake and a pull drive of a vehicle equipped with a wheel slip control system, comprising:

determining first variables assigned to at least one of a wheel and an associated wheel brake;

calculating at least one second variable for at least one wheel axle of the vehicle from a set of the first variables associated with one of wheels and wheel brakes of the at least one wheel axle, the at least one second variable being a measure of a difference between values of the set of the first variables associated with the at least one wheel axle;

determining a third variable by one of averaging over time and filtering the at least one second variable for a period of time such that there is a measure of a difference between the values of the set of the first variables associated with the at least one wheel axle when the difference is not due to an intervention by the wheel slip control system; and comparing a value of the third variable with a preselectable limit value.

* * * * *

UNITED STATES PATENT AND TRADEMARK OFFICE
CERTIFICATE OF CORRECTION

PATENT NO. : 6,859,714 B2
DATED : February 22, 2005
INVENTOR(S) : Friedhelm Burhard et al.

It is certified that error appears in the above-identified patent and that said Letters Patent is hereby corrected as shown below:

Column 3,
Line 53, change "| M1 | ≈ | Mr | ." to -- | M1 | ≠ |Mr | , --.

Column 5,
Line 60, change "$S_{k+1} = s_k + a * (s_{in} - s_k)$" to -- $S_{k+1} = s_k + a * (s_{in} - s_k)$, --.

Signed and Sealed this

Twenty-third Day of August, 2005

JON W. DUDAS
*Director of the United States Patent and Trademark Office*